(12) United States Patent
Laackmann

(10) Patent No.: US 7,710,255 B2
(45) Date of Patent: May 4, 2010

(54) CIRCUIT ARRANGEMENT AND METHOD FOR PREVENTING CIRCUIT OPERATION

(75) Inventor: Peter Laackmann, Munich (DE)

(73) Assignee: Infineon Technologies AG, Neubiberg (DE)

( * ) Notice: Subject to any disclaimer, the term of this patent is extended or adjusted under 35 U.S.C. 154(b) by 322 days.

(21) Appl. No.: 11/873,717

(22) Filed: Oct. 17, 2007

(65) Prior Publication Data

US 2008/0088429 A1 Apr. 17, 2008

(30) Foreign Application Priority Data

Oct. 17, 2006 (DE) ................ 10 2006 048 969

(51) Int. Cl.
*G08B 29/00* (2006.01)
*G06F 7/04* (2006.01)

(52) U.S. Cl. .............. 340/511; 340/501; 340/506; 340/521; 235/380; 726/20; 726/34

(58) Field of Classification Search ........... 340/511, 340/501, 521; 726/20, 34
See application file for complete search history.

(56) References Cited

U.S. PATENT DOCUMENTS 6,229,439 B1 * 5/2001 Tice ..................... 340/506

FOREIGN PATENT DOCUMENTS

| DE | 101 61 046 | 7/2003 |
|---|---|---|
| DE | 102 47 485 | 4/2004 |
| DE | 10 2004 021 346 | 12/2005 |

* cited by examiner

*Primary Examiner*—Donnie L Crosland
(74) *Attorney, Agent, or Firm*—Dickstein, Shapiro, LLP.

(57) ABSTRACT

A circuit arrangement in whose operational range a system parameter or an ambient parameter lies within a first range. The arrangement includes a node configured to receive a misadjustment signal and a sensor configured to detect the system parameter or the ambient parameter. The sensor is coupled to the node and is configured to detect whether the system parameter or the ambient parameter lies in a predetermined second range. The sensor outputs an alarm signal if the system parameter or the ambient parameter does not lie in the second range, within which the first range lies. The sensor is further configured to permanently adjust the second range in reaction to the misadjustment signal such that the second range does not encompass the first range.

24 Claims, 5 Drawing Sheets

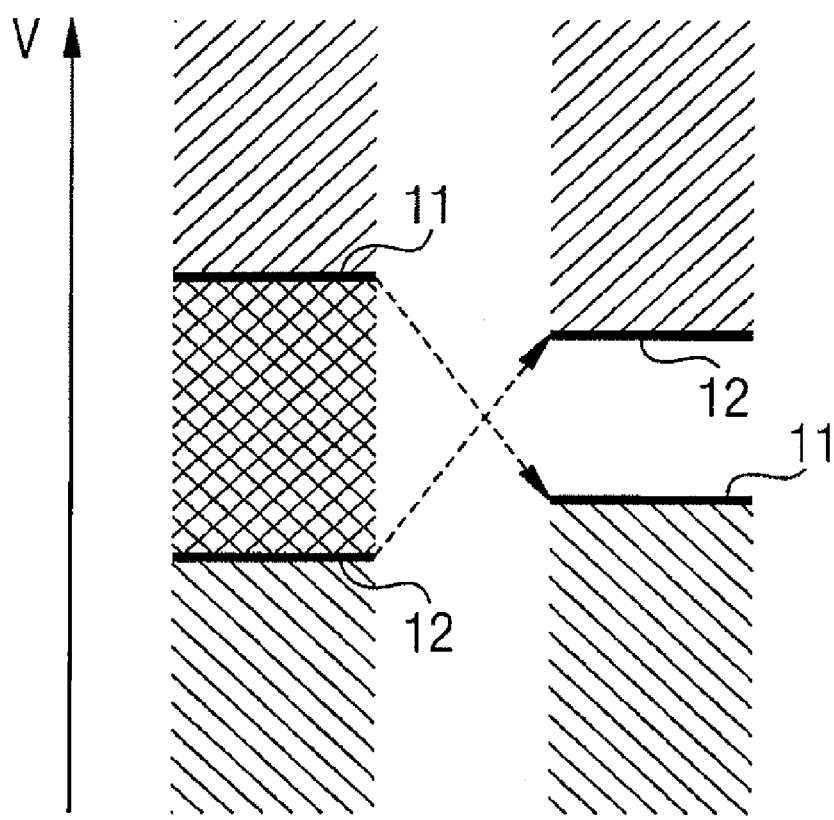

CIRCUIT ARRANGEMENT AND METHOD FOR PREVENTING CIRCUIT OPERATION

CROSS-REFERENCE TO RELATED APPLICATION

This application claims priority to German Patent Application Serial No. 102006048969.1, which was filed Oct. 17, 2006, and is incorporated herein by reference in its entirety.

BACKGROUND

Smart cards with a security controller are used for example for security-relevant applications. Such smart cards can be used for access authorization proofs, bank cards or pay television access cards. Often their use is provided only for a predetermined period of time or is intended to be prevented after issue, for example when the access authorization is cancelled or the pay television contract is terminated. The withdrawal of such cards by the issuer is associated with high effort and costs, or is not possible. Therefore, these cards usually have a predetermined validity, after the expiry of which their operation is intended to be prevented. After the validity has expired, these cards remain in circulation, and there is the risk that these cards can be reprogrammed and converted to another purpose or be used for illegal purposes by experienced attackers.

Various approaches have been pursued hitherto in order to block the cards as far as possible permanently after their validity has expired. By way of example, a protection by so-called "fuses" which is programmed and implemented in hardware can be provided, which prevents access after the validity has expired. Since this is tested prior to every use, a further use of the security controller can thus be impeded after the validity has expired.

According to different approaches values are written to one or more memory cells, which values are then checked by the program or the hardware of the security controller and, if appropriate, trigger the blocking of the further program sequence.

Furthermore the programming voltage of a chip is blocked, such that the latter can no longer be reprogrammed as easily.

BRIEF DESCRIPTION OF DRAWINGS

Embodiments of the invention are described below with reference to the drawing.

FIG. 5 shows the misadjustment of range limits of a sensor.

DETAILED DESCRIPTION

One embodiment comprises a circuit arrangement in whose operational range a system parameter or an ambient parameter lies within a first range. The circuit arrangement comprises a node for applying a misadjustment signal and a sensor for detecting the system parameter or the ambient parameter. The sensor is coupled to the node and is designed to detect whether the system parameter or the ambient parameter lies in a predetermined second range. The sensor outputs an alarm signal if the system parameter or the ambient parameter does not lie in the second range, within which the first range lies. The sensor is further designed to permanently adjust the second range in reaction to the misadjustment signal in such a way that the second range does not encompass the first range.

Figure 1:
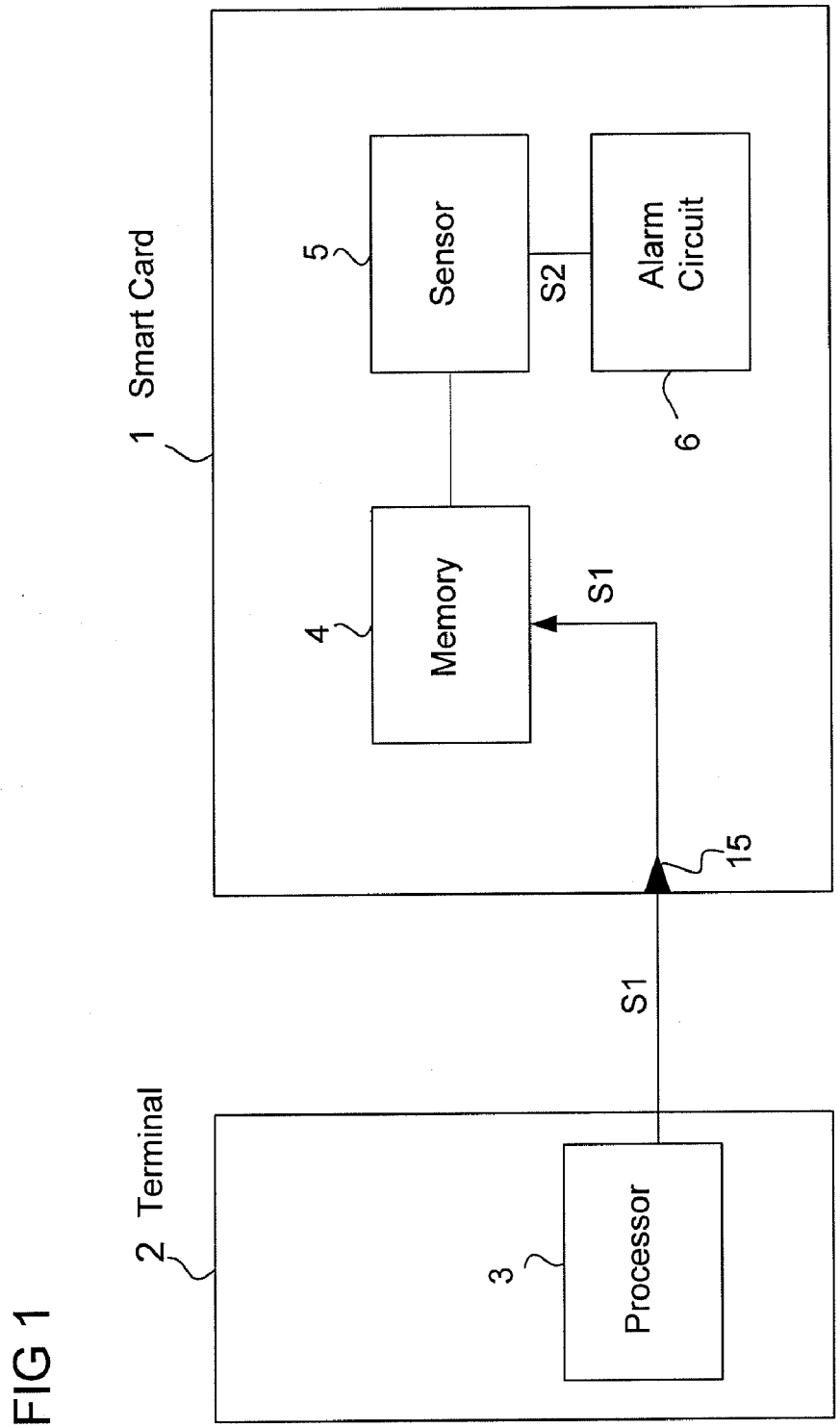
FIG. 1 shows a schematic illustration of an embodiment of a circuit arrangement in a smart card with a terminal.

FIG. 1 shows a schematic illustration of an embodiment of a smart card 1 comprising a circuit arrangement, which communicates with a terminal 2. It should be noted that the illustration is a schematic, greatly simplified illustration in which size relationships and constructional features are disregarded. The circuit blocks illustrated are usually embodied in integrated form in a chip that is introduced in a card body.

The terminal 2 comprises a terminal processor 3, which is designed to output a misadjustment signal S1.

The smart card 1 comprises a sensor 5 for detecting a parameter, which sensor is coupled to a configuration memory 4. Configuration parameters are stored in the configuration memory 4 in order to adjust the sensor 5. The sensor 5 is designed to output an alarm signal S2. The sensor 5 is coupled to an alarm circuit 6 in such a way that the latter carries out an alarm action in reaction to the alarm signal S2. If the parameter to be detected by the sensor 5 is outside a range predetermined by the configuration parameters, the sensor 5 outputs the alarm signal S2.

A parameter to be detected can be a system parameter or an ambient parameter. These can also include the signals that can be provided by the terminal 2 for operation, such as the supply voltage or the clock signal.

A smart card is a reactive system. The signals required for operation of the circuit arrangement provided on the smart card 1 are provided by the terminal 2. In order to check whether these system parameters lie within the range provided in the normal operating mode, the sensor 5 can be embodied as supply voltage sensor or as clock frequency sensor.

It is also conceivable, however, for the sensor 5 to be designed to detect ambient parameters. Suitable ambient parameters are the temperature, light or other radiation. If the parameter detected by the sensor 5 lies outside the predetermined range, an alarm signal is output. Such a deviation allows a conclusion about an attack to be drawn.

If the terminal processor 3 outputs the misadjustment signal S1 and applies it to the circuit arrangement via an input 15, said signal acts virtually as "destruction command". The configuration parameters in the configuration memory 4 are set in such a way that the circuit arrangement triggers the alarm signal S2 even in the case of parameter values indicating the normal operating mode. In this way, the sensor 5 is permanently reconfigured in such a way that even in the normal operating mode, an activation of this sensor system is obtained, an alarm state thereby prevails continuously and the chip with the circuit arrangement is blocked for further use.

The sensor 5 can be embodied as voltage sensor, which is intended in normal operation to prevent the component with the circuit arrangement from being operated at a supply voltage of greater than 5 V. The sensor 5 is set by means of suitable values in the configuration memory 4.

FIG. 5 illustrates the misadjustment. In the sensor 5 a check is made to determine whether the detected voltage is within a predetermined range. Said range is delimited by two limits, a first limit 11 and a second limit 12. In order not to trigger an alarm, the detected voltage must be both below the first limit 11, for example 6 V, and above the second limit 12, for example 4.5 V. This is illustrated in FIG. 5 by the overlapping range illustrated in hatched fashion. This range is chosen such that in the normal operating mode or in the operational range of the circuit arrangement, the parameter to be detected lies within said range.

The misadjustment signal S1 triggers the shifting of the first and second limits 11, 12. The alarm voltage range of the sensor is altered in such a way that even normal operation is no longer possible. This is done for example by narrowing the first limit 11 below the now raised second limit 12, such that an overlapping range is no longer provided, as is illustrated in FIG. 5. Consequently, the changed range encompasses no values since the upper limit is smaller than the lower limit. However, significantly lowering the hatched range is also suitable.

The new configuration is fixedly programmed in, for example into a so-called EEPROM as configuration memory 4. After this storage, the chip still runs with the previous configuration parameters, but the new configuration parameters are accepted upon renewed starting. The sensor 5 is set correspondingly and, consequently, the chip is also blocked for normal operation.

The definition of such limits is for example also conceivable for a clock frequency sensor or a temperature sensor. A possible sensor 5 configured as light sensor can be set such that the alarm signal S2 is triggered independently of the light intensity.

Figure 2:
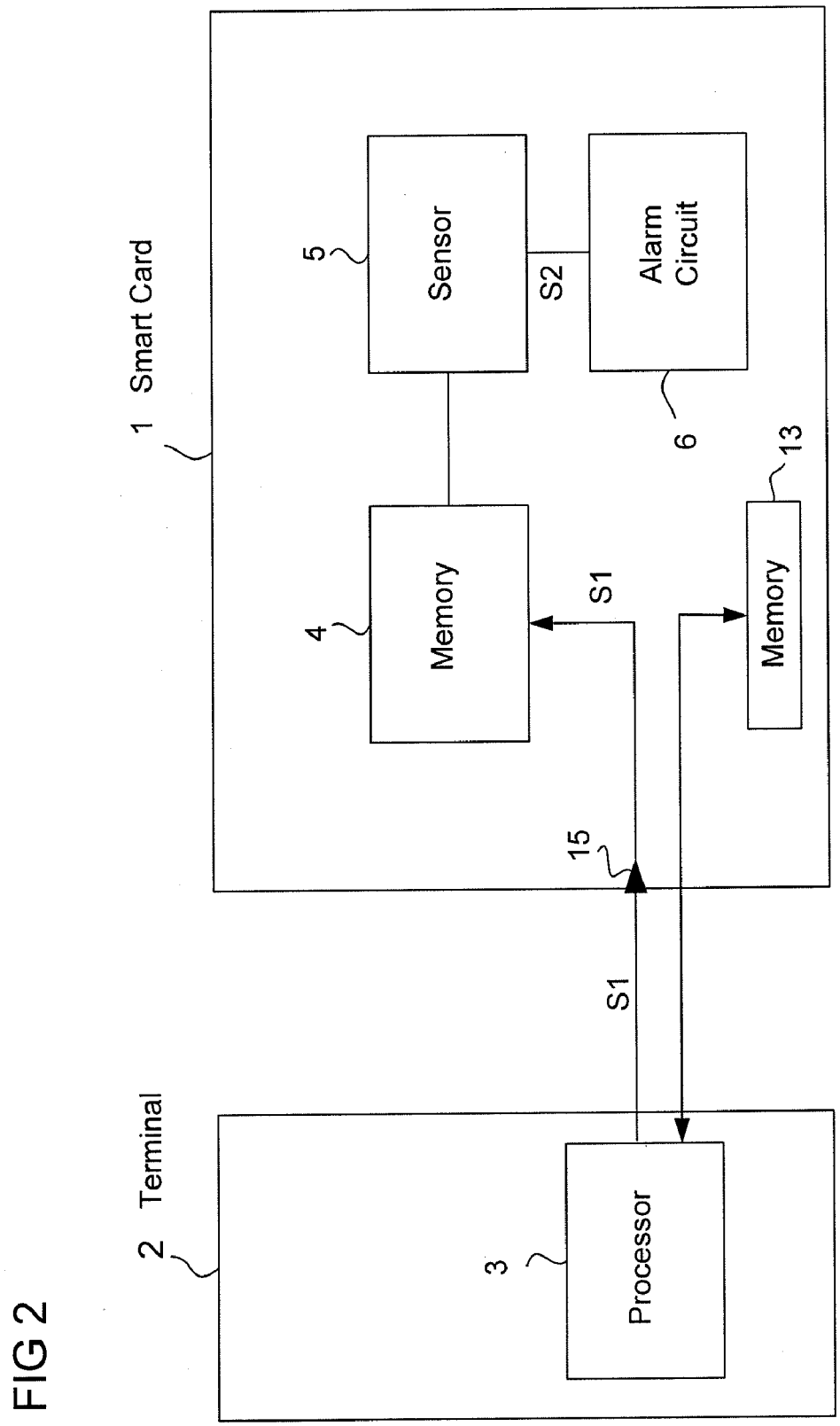
FIG. 2 shows a schematic illustration of an embodiment of a circuit arrangement in a smart card with a terminal.

FIG. 2 shows an embodiment of the smart card 1, which communicates with the terminal 2.

Figure 3:
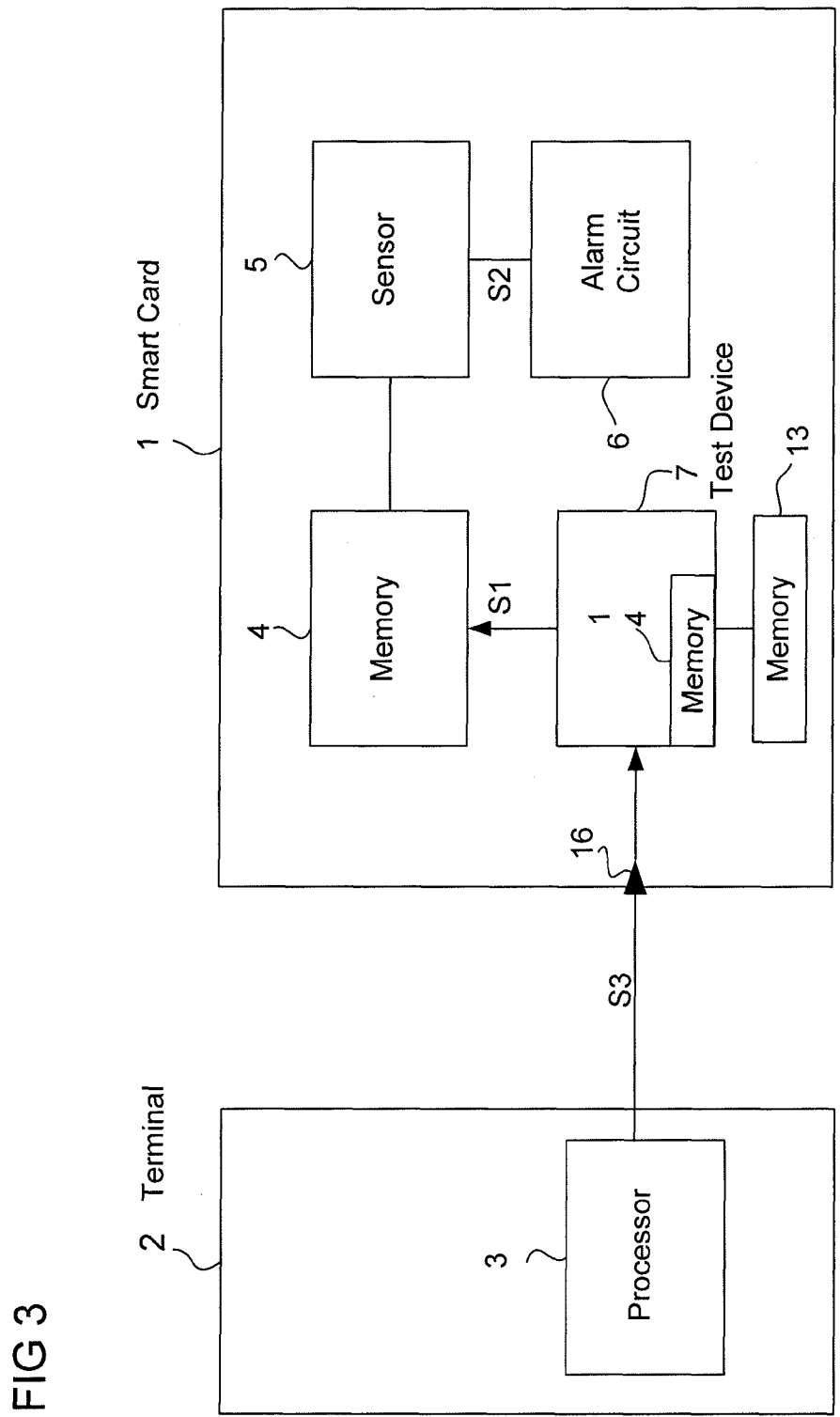
FIG. 3 shows a schematic illustration of an embodiment of a circuit arrangement in a smart card with a terminal.
Figure 4:
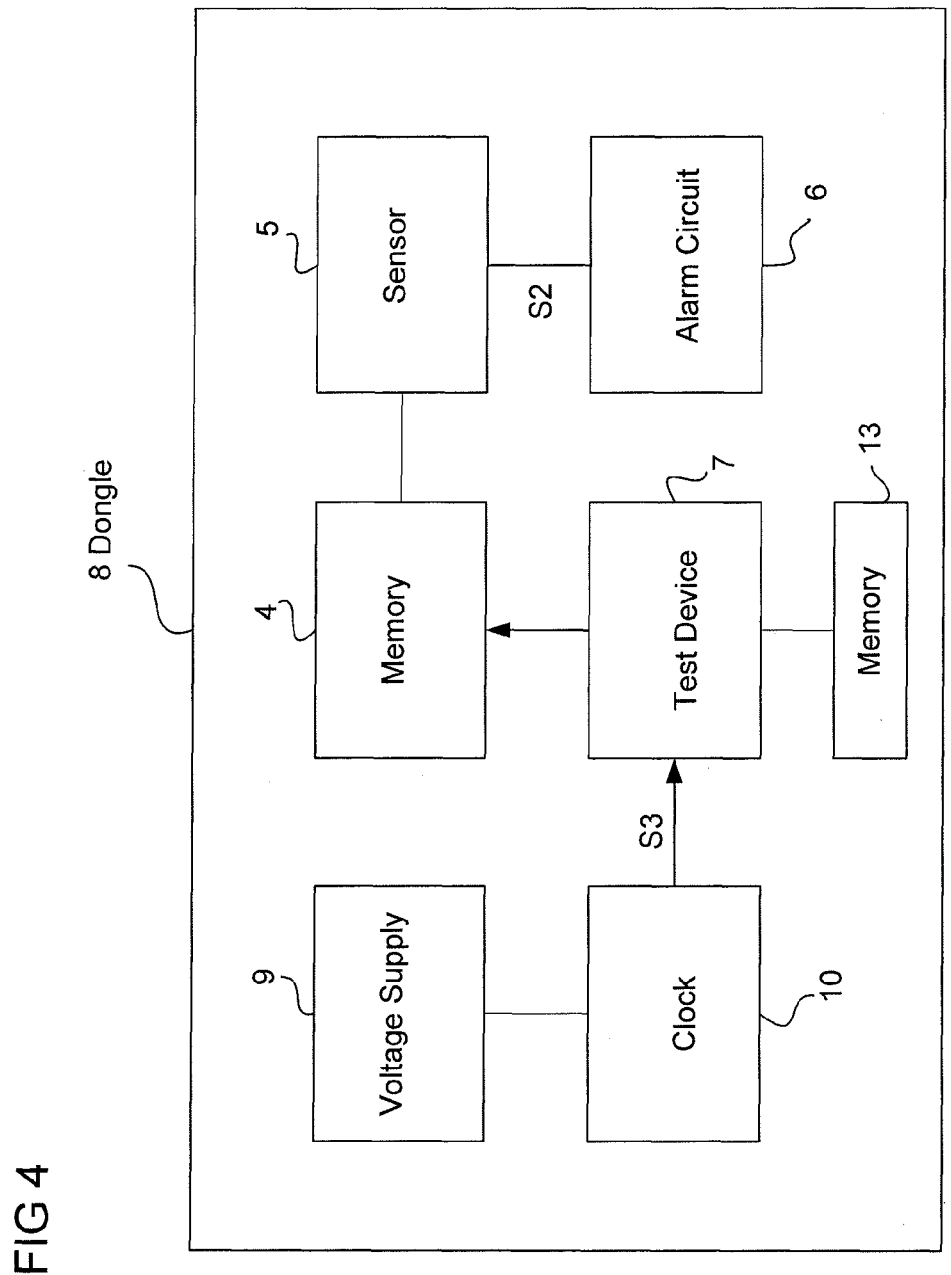
FIG. 4 shows a schematic illustration of a circuit arrangement in a dongle.

In this embodiment and the embodiments illustrated in FIGS. 3 and 4, identical reference symbols represent identical arrangement parts. In order to avoid repetition, corresponding arrangements are not described repeatedly.

FIG. 2 differs from FIG. 1 to the effect that a memory 13 is provided, in which the predetermined lifetime is stored. This is advantageously a non-volatile and, for security reasons, also non-rewritable memory. During the communication between the terminal 2 and the smart card 1, the content of said memory 13 is read out and checked by the terminal processor 3 to the effect of whether the lifetime of the smart card 1 has already expired. If this is the case, the misadjustment signal S1 is output by the terminal processor 3 in order to block the smart card 1.

The embodiment illustrated in FIG. 3 differs from those illustrated above in that the terminal processor 3 now outputs a time-indicating signal S3. The time-indicting signal S3 is for example a date and/or time of day signal. However, it is also conceivable to provide a differently configured time-indicating signal S3, for example the counter reading of a counter that continuously counts up in the terminal 2.

In contrast to the circuit arrangements illustrated above, a test device 7 is provided in the circuit arrangement illustrated in FIG. 3, said test device being designed to output the misadjustment signal S1. Furthermore, the memory 13 is coupled to the test device 7.

The test device 7 checks, on the basis of the time-indicating signal S3 and the stored predetermined lifetime, whether the latter has already expired. If the predetermined lifetime has been exceeded, the misadjustment signal S1 is output by the test device 7 and triggers the already described alteration of the configuration parameters for the sensor 5.

As further, optional security means, the test device 7 can comprise a further memory 14, or be coupled to the latter. The last applied value of the time-indicating signal S3, for example the date, is stored in the further memory 14. During the next comparison, the value of the time-indicating signal S3 now present is compared with the stored value. In this case, a check is made to determine whether the present value of the time-indicating signal S3 is posterior with respect to the stored value. If this is not the case, that allows a conclusion to be drawn about an attack by a fake date.

In such a case, the test device 7 triggers an alarm action. This can be done by the misadjustment signal S1 being provided. As an alternative, it is also conceivable for the test device 7 to be coupled to the alarm circuit in order to trigger the alarm action. This last has the advantage that although the circuit arrangement reacts to the attack, it is not permanently blocked.

FIG. 4 shows a schematic illustration of a circuit arrangement for a so-called dongle 8. Unlike a smart card 1, this is not a reactive system, but rather a proactive system which can be operated independently. Therefore, it is necessary to provide means required for this.

The dongle 8 additionally has a clock 10, which generates the time-indicating signal S3. Said clock 10 needs not necessarily be a clock in the actual literal sense that provides the time of day and/or the date, rather a counter can also be involved as a particularly simple configuration. Furthermore, the dongle 8 is provided with a voltage supply device 9, which feeds the clock 10 with a supply voltage in order to generate the time-indicating signal S3. The voltage supply device 9 also supplies the other blocks of the circuit arrangement with the supply voltage.

In this embodiment, the time-indicating signal S3 is provided internally within the circuit and coupled to the test device 7. The functioning of the rest of the blocks is as in the case of the smart cards 1 described above.

This type of blocking is not just restricted to circuit arrangements whose lifetime has expired, but rather can generally be used to block circuit arrangements by the misadjustment signal being applied.

In order to store the predetermined lifetime of the circuit arrangement, a memory means is provided in said circuit arrangement.

In a simple configuration of the circuit arrangement according to the invention, said circuit arrangement comprises an input for the application of the misadjustment signal. In this way, the circuit arrangement, which is accommodated for example in a chip of a smart card, is blocked when the smart card is in contact with a smart card terminal by means of the smart card terminal transmitting the misadjustment signal to the smart card.

In an alternative configuration, the misadjustment signal is not provided as an external signal, for example by the terminal, but rather is generated internally within the circuit by a test device. In this embodiment, the circuit arrangement has a time signal input for the application of a time-indicating signal, which is coupled to a test device. The test device is designed to check whether the predetermined lifetime of the circuit arrangement has expired, and outputs the misadjustment signal in this case. In this case, the communication of the smart card with the terminal in order to request the time-indicating signal can be initialized by the smart card.

In one advantageous development, the test unit is configured in such a way that, when the time-indicating signal is applied, said test unit checks whether the value of said signal is posterior with respect to a stored value of the previously applied time-indicating signal. This prevents manipulation attempts based on applying a manipulated time-indicating signal in order to pretend to the circuit arrangement by means of a false date, for example, that its lifetime has not yet expired.

The circuit arrangement is advantageously designed in such a way that it performs an alarm action in reaction to the alarm signal in order to prevent further operation of the circuit arrangement. An embodiment of an alarm action is putting the circuit arrangement into a predetermined state, or performing a reset, or preventing operation.

In one embodiment, the second range, with regard to which the sensor effects detection, has a first range limit and a second range limit. Initially the sensor is adjusted such that the first range limit is greater than the second range limit. The sensor detects whether the system parameter or the ambient parameter is less than the first range limit and greater than the second range limit. If this is not the case, a conclusion about an attack can be drawn, and the alarm signal is triggered. In the event of the misadjustment of the range limits, the latter are shifted in such a way that an overlapping range within which no alarm is triggered is no longer present. Rather, the first range limit is now less than or equal to the second range limit. Consequently, the second range no longer encompasses parameter values for which no alarm is triggered. In this way, the sensor is permanently reconfigured such that an activation of the sensor is obtained even in the normal operating mode. An alarm state thereby prevails continuously, which permanently blocks the security controller or the chip.

Diverse configurations are conceivable for the sensor. The sensor can be embodied for example as a voltage sensor for detecting the supply voltage. The embodiment as clock frequency sensor is also conceivable. Typical system parameters are detected with these configurations. Furthermore, the configuration of the sensor as light or radiation sensor or as temperature sensor is conceivable. These configurations aim rather at detecting ambient parameters.

The use of such a circuit arrangement is not just restricted to smart cards. A further use is constituted by so-called dongles, which generate keys for security systems, for example in the form of so-called PINS for electronic banking transactions. Customary configurations of said dongles do not rely on the communication with or the supply by a terminal, but rather have an internal clock for generating the time-indicating signal and an internal voltage supply.

The method aims to prevent normal operation of an integrated circuit arrangement on a chip, wherein the circuit arrangement comprises a sensor for detecting a system parameter or an ambient parameter. The method comprises:

checking whether the detected system parameter or the detected ambient parameter lies in a predetermined range, wherein the range is predetermined in such a way that, in the operational range of the circuit arrangement, the system parameter or the ambient parameter lies in the range, carrying out normal operation if the detected system parameter or the detected ambient parameter lies in the range, carrying out an alarm action if the detected system parameter or the detected ambient parameter lies outside the range, altering the range in reaction to a misadjustment signal in such a way that, in the operational range, the system parameter or the ambient parameter lies outside the altered range.

This method comprises that the sensor is reconfigured in such a way that an alarm action is permanently triggered even under normal operating conditions of the circuit arrangement.

The alteration of the sensor parameters may be carried out when a predetermined lifetime has expired, in order to ensure that operation is then permanently prevented.

As a further security feature of one embodiment, a check is made to determine whether the values of the time-indicating signal for comparisons that are carried out successively are in a plausible temporal relation to one another. Manipulation attempts through false, manipulated time indications are combated in this way.

In the case of the method, too, embodiments of system or ambient parameters are the voltage, the clock frequency, the temperature or the light or radiation intensity, which can be detected by the sensor.

Even though smart cards and dongles have been described in detail, it goes without saying that the invention is not restricted to these areas, but rather can be used in a multiplicity of security-relevant circuit arrangements in order to permanently block the latter.

What is claimed is:

1. A circuit arrangement in whose operational range a system parameter or an ambient parameter lies within a first range comprising:
    a node configured to receive a misadjustment signal; and
    a sensor, which is coupled to the node and is configured to:
        detect the system parameter or the ambient parameter,
        detect whether the system parameter or the ambient parameter lies in a predetermined second range,
        output an alarm signal if the system parameter or the ambient parameter does not lie in the second range, within which the first range lies, and
        permanently adjust the second range in reaction to the misadjustment signal such that the second range does not encompass the first range.

2. The circuit arrangement as claimed in claim 1, wherein the node is embodied as an input for the misadjustment signal.

3. The circuit arrangement as claimed in claim 1, further comprising a memory in which a predetermined lifetime value is stored.

4. The circuit arrangement as claimed in claim 3, further comprising a time signal input configured to receive a time-indicating signal.

5. The circuit arrangement as claimed in claim 4, further comprising a test device, which is coupled to the node, to the time signal input and to the memory, and is configured to check whether the predetermined lifetime value has been exceeded, and to output the misadjustment signal if the lifetime value has been exceeded.

6. The circuit arrangement as claimed in claim 4, further comprising a signal generator configured to generate the time-indicating signal.

7. The circuit arrangement as claimed in claim 5, wherein the test device is configured to store a value of the time-indicating signal and to compare the stored value with a value of the present time-indicating signal to determine whether the stored value indicates anteriority with respect to the present time-indicating signal.

8. The circuit arrangement as claimed in claim 1, wherein an alarm action is performed in reaction to the alarm signal.

9. The circuit arrangement as claimed in claim 1, wherein the alarm signal is output if the system parameter or the ambient parameter is less than a first range limit of the second range and greater than a second range limit of the second range, wherein the range limits can be adjusted in reaction to the misadjustment signal such that the first range limit is less than or equal to the second range limit.

10. The circuit arrangement as claimed in claim 1, wherein the sensor is embodied as voltage sensor.

11. The circuit arrangement as claimed in claim 1, wherein the sensor is embodied as clock frequency sensor.

12. The circuit arrangement as claimed in claims 1, wherein the sensor is embodied as light or radiation sensor.

13. The circuit arrangement as claimed in claim 1, wherein the sensor is embodied as temperature sensor.

14. A smart card comprising the circuit arrangement as claimed in claim 1.

15. A dongle comprising the circuit arrangement as claimed in claim 1.

16. A circuit arrangement in whose operational range a system parameter or an ambient parameter lies within a first range comprising:
   means for receiving a misadjustment signal; and
   a sensor means for detecting whether the system parameter or the ambient parameter lies in a predetermined second range, within which the first range lies, for outputting an alarm signal if the system parameter or the ambient parameter does not lie in the second range, and for permanently adjusting the second range in reaction to the misadjustment signal in such a way that the second range does not encompass the first range.

17. A method for preventing normal operation of an integrated circuit arrangement on a chip, wherein the circuit arrangement comprises a sensor configured to detect a system parameter or an ambient parameter, and wherein the method comprises:
   checking whether the detected system parameter or the detected ambient parameter lies in a predetermined range, wherein the range is predetermined such that, in the operational range of the circuit arrangement, the system parameter or the ambient parameter lies in the range;
   carrying out normal operation if the detected system parameter or the detected ambient parameter lies in the range;
   carrying out an alarm action if the detected system parameter or the detected ambient parameter lies outside the range; and
   altering the range in reaction to a misadjustment signal such that, in the operational range, the system parameter or the ambient parameter lies outside the altered range.

18. The method as claimed in claim 17, wherein the circuit arrangement has a predetermined lifetime, and the altering is carried out if expiry of the lifetime has been detected.

19. The method as claimed in claim 18, wherein the expiry of the lifetime is detected by a comparison of a time-indicating signal with the predetermined lifetime.

20. The method as claimed in claim 19, wherein a value of the time-indicating signal is stored upon the first occasion of carrying out the comparison and is compared with a value of the time-indicating signal upon a second occasion of carrying out the method to determine whether the time-indicating signal stored upon the first occasion is anterior with respect to the time-indicating signal upon stored upon the second occasion.

21. The method as claimed in claim 17, wherein the system parameter is a voltage.

22. The method as claimed in claim 17, wherein the system parameter is a clock frequency.

23. The method as claimed in claim 17, wherein the system parameter or the ambient parameter is a temperature.

24. The method as claimed in claim 17, wherein the ambient parameter is a light or radiation intensity.

\* \* \* \* \*